Figure 1:
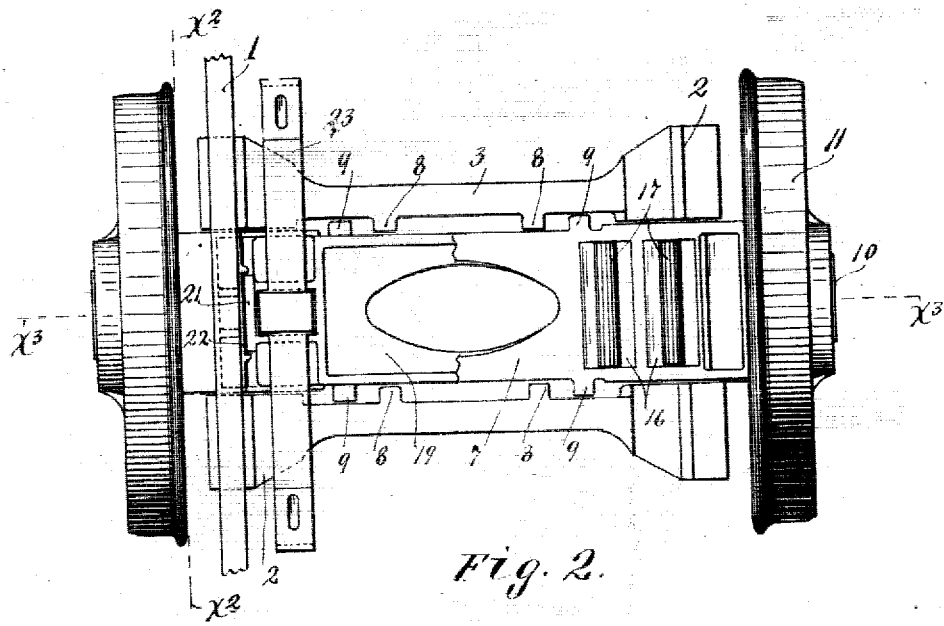

No. 820,400. PATENTED MAY 15, 1906.
J. F. DE VOY.
TRAILING TRUCK.
APPLICATION FILED APR. 17, 1905.

2 SHEETS—SHEET 1.

Witnesses.
H. Opsahl.
Jeppesen.

Inventor.
J. F. De Voy.
By his Attorneys.
William Merchant

No. 820,400. PATENTED MAY 15, 1906.
J. F. DE VOY.
TRAILING TRUCK.
APPLICATION FILED APR. 17, 1905.

2 SHEETS—SHEET 2.

Witnesses
A. H. Opsahl
E. W. Jeppesen

Inventor
J. F. De Voy
By his attorneys
Williamson & Merchant

UNITED STATES PATENT OFFICE.

JAMES F. DE VOY, OF MILWAUKEE, WISCONSIN.

TRAILING TRUCK.

No. 820,400.　　　Specification of Letters Patent.　　　Patented May 15, 1906.

Application filed April 17, 1905. Serial No. 255,912.

*To all whom it may concern:*

Be it known that I, JAMES F. DE VOY, a citizen of the United States, residing at Milwaukee, in the county of Milwaukee and State of Wisconsin, have invented certain new and useful Improvements in Trailing Trucks; and I do hereby declare the following to be a full, clear, and exact description of the invention, such as will enable others skilled in the art to which it appertains to make and use the same.

My invention relates particularly to locomotive construction, and has for its especial object to provide improved means for mounting the trailing truck with freedom for lateral movements transversely of the locomotive-framework.

To the above ends the invention consists of the novel devices and combinations of devices hereinafter described, and defined in the claims.

Hitherto in so-called "radial trucks" for locomotives the "trailing truck" has been mounted to move laterally on the arc of a circle, and in carrying out that construction the trailing truck has been permitted its lateral movement only by overcoming a sliding frictional resistance between parts which carry the load onto the said trailing truck. Also in the construction referred to a spring device has been employed and so applied as to exert a strain tending to maintain the trailing truck in an intermediate position, which position it properly occupies when running on a straight track. With such construction, however, it so happens that under the weight of the load on the trailing truck the friction between the parts which must slip over each other is so great that the spring device is inefficient to overcome the same, so that, in fact, the flanges of the wheels of the trailing truck are crowded with great force against the rails in causing the trailing truck to assume its intermediate position after having passed from a curve onto a straight track.

By my invention I overcome the above defects and provide a construction of which the trailing truck of the locomotive is mounted for free lateral movements to adapt itself both to a curved track and to a straight track and in which the weight of the load on the trailing truck is caused to exert force tending to maintain the said trailing truck in its intermediate position when on a straight track, but which will nevertheless offer but little friction or resistance to a lateral movement of said trailing truck when running on a curved track.

My invention is illustrated in the accompanying drawings, wherein like characters indicate like parts throughout the several views.

Figure 2:
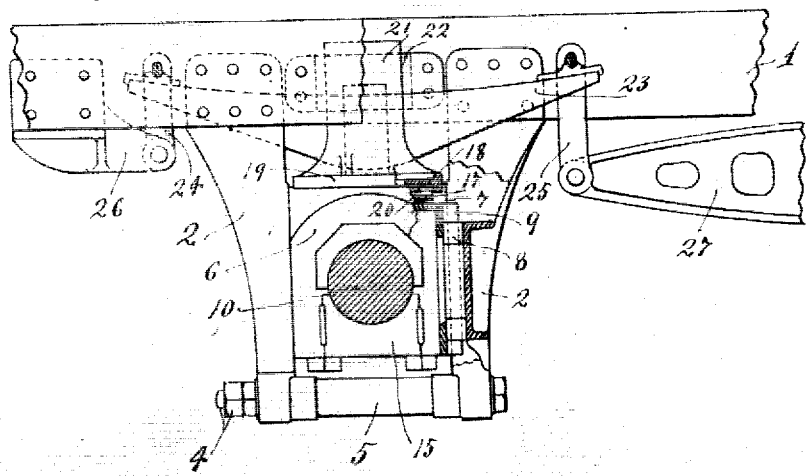
Figure 3:
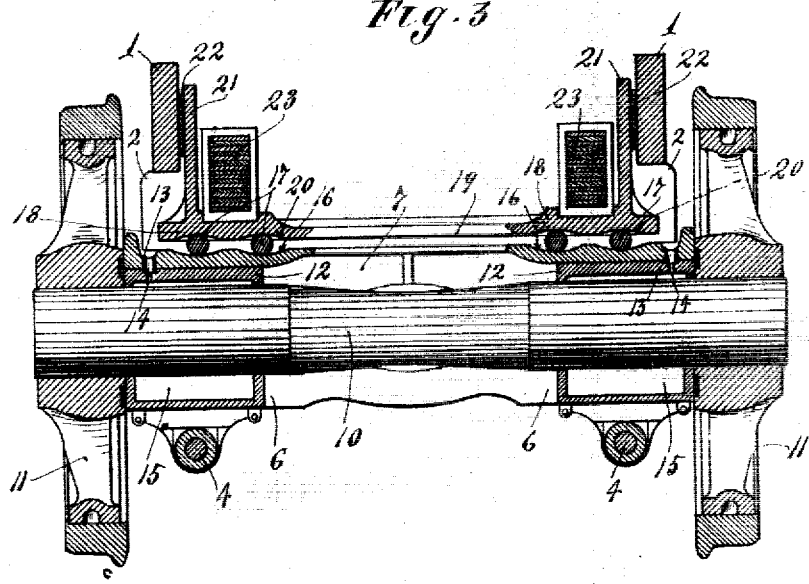
Figure 4:
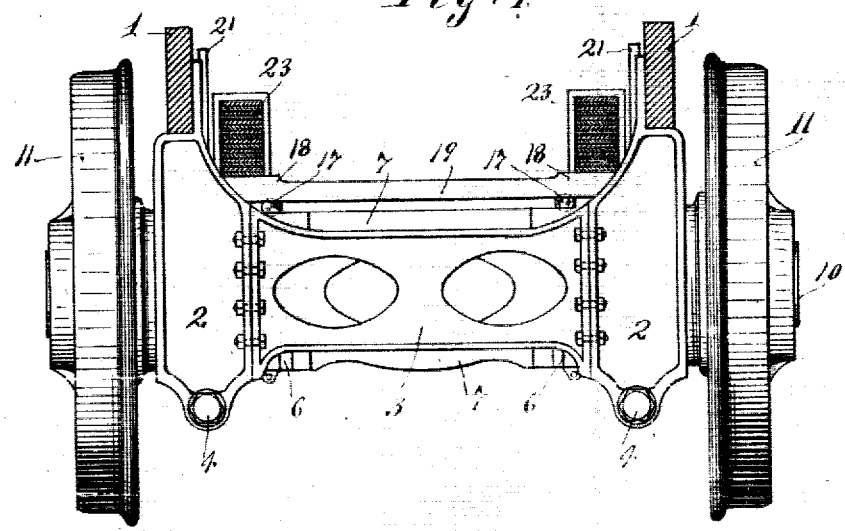

Referring to the drawings, Figure 1 is a plan view showing a part of an engine-truck the trailing truck of which is connected to the main frame thereof in accordance with my invention, some parts being broken away. Fig. 2 is a vertical section taken approximately on the line $x^2 x^2$ of Fig. 1, some parts being broken away. Fig. 3 is a transverse vertical section taken approximately on the line $x^3 x^3$ of Fig. 1; and Fig. 4 is a front elevation of the parts shown in Fig. 1, the main frame and the springs being shown in section.

The numeral 1 indicates laterally-spaced longitudinally-extended bars or members of a locomotive-frame, to which members depending guide-pedestals 2 are rigidly secured, the pedestals, which are in line with each other transversely of the truck, being, as shown, separately formed, but rigidly secured to tie-plates 3. The lower ends of the pedestals 2, which are on the same side as the truck, are, as shown, tied together by nutted bolts 4 and are spaced apart by spacing-sleeves 5, through which said bolts are passed. The journal-boxes 6 are rigidly united, being, as shown, cast integrally with a channel-like frame 7, that is open at its bottom. These journal-boxes 6 are thus connected for common movements, and they are free for limited movements transversely of the truck between the coöperating guide-pedestals 2, such movements being limited by coöperating stop-lugs 8 and 9, respectively, on the tie-plates 3 and on the sides of the box-connecting frame 7. (See particularly Figs. 1 and 2.)

The axle 10 of the trailing truck is provided with wheels 11, secured thereto in the usual way. Said axle is journaled in the journal-boxes 6, and bearing-brasses 12 are interposed between said axle and the top plates of said journal-box.

As shown, the axle-boxes 6 are provided in their tops with oil-tubes 13, that are seated in the tops of the respective bearing-brasses 12 and register with oil-ducts 14 in said "brasses." Oil-boxes 15 are detachably secured between the sides of the journal-boxes below the axle. In the top plates of the journal-boxes are concave roller-seats 16, preferably formed directly in said journal-boxes. Bearing-rollers 17 rest loosely in the roller-seats 16. Upper roller-bearings, herein designated as "roller-bearing caps," 18 are formed integrally with a transverse horizontally-extended tie-plate 19. These roller-caps 18 are formed with concave roller-seats 20, that rest upon the respective bearing-roller 17. The so-called "concave roller-seats" 16 and 20 are, as shown, cylindrical; but they may be formed on various lines which will adapt them to coöperate with the bearing-rollers to yieldingly maintain the trailing truck in an intermediate or central position transversely of the main frame under the weight of the load on the truck. The term "bearing-rollers" is also herein used in a broad sense to include rolling bodies or elements. Near their ends the roller-bearing caps 18 have upwardly-projecting guide-legs 21, which, as shown, work against channel-shaped chafing-plates 22, that are rigidly secured to the inner surfaces of the frame members 1. In this way said roller-caps are held against movements transversely of the main frame of the engine, or, otherwise stated, are held against endwise movements with the journal-boxes, but are permitted to raise and lower, as is necessary under a lateral movement of the wheels 11, axle 10, and journal-boxes 6.

The main frame or body of the engine is of course yieldingly supported by a suitable spring-rigging. Certain members of this spring-rigging rest directly upon the roller-bearing caps 18, and, as shown, elliptical springs 23 are seated upon the said caps. In other instances, however, equalizing beams or levers, forming part of the spring-rigging, will be seated on the said roller-bearing caps. In the construction illustrated in the drawings links 24 and 25 are suspended from the ends of the elliptical springs 23, and the lower ends of the links 24 are pivoted to brackets 26, rigidly secured to the frame members 1, while the lower ends of the links 25 are pivoted to the rear ends of equalizing-beams 27, which beams are connected into the lever system of the spring-rigging in a manner not necessary for the purposes of this case to further consider.

With the trailing truck mounted as above described it is evident that the journal-boxes, the axle, and the wheels of the said trailing truck are free for lateral movements—that is, movements transversely of the body of the locomotive—and that said movement is resisted by but very slight friction, and, furthermore, that the weight of the load on the bearing-roller and coöperating roller-seats exerts a very considerable force tending to maintain the laterally-movable parts of the trailing truck in their intermediate or central position and to restore the said parts to such intermediate positions when the locomotive runs from a curved track onto a straight track. The flanges of the wheels of the trailing truck are not, therefore, forced under great pressure against the rails. The trailing truck mounted as above described is not, properly speaking, a radial truck, since it has a straight-line lateral movement transversely of the locomotive-body instead of being mounted for movements on the arc of a circle, as in so-called "radial trucks." The trailing truck constructed and mounted as above described has been incorporated in a large passenger-locomotive, which locomotive has been put into actual use and has been run at enormously high speeds with most satisfactory results. In practice it has also been found that the particular truck described can be constructed and applied to a locomotive at a very small cost. In fact, it has been found that a very great saving over the cost of applying the so-called "radial trucks" may be effected by the use of my improved lateral-motion truck.

The truck mechanism is capable of modifications within the scope of my invention as herein set forth and claimed.

What I claim, and desire to secure by Letters Patent of the United States, is as follows:

1. In a truck, the combination with a main frame, having guide-pedestals at its sides, of a pair of rigidly-connected axle-boxes working between said pedestals, transversely of said frame, a wheel-equipped axle journaled in said boxes, a pair of rigidly-connected roller-caps, held against movement transversely of said main frame, and bearing-rollers interposed between said journal-boxes and said roller-caps, substantially as described.

2. In a truck, the combination with a main frame, having guide-pedestals at its sides, of a pair of rigidly-connected axle-boxes working between said pedestals, transversely of said frame, said axle-boxes having concave roller-seats on their upper portions, a wheel-equipped axle journaled in said box, rigidly-connected roller-bearing caps held against movement transversely of said frame, said caps having concave roller-seats, and bearing-rollers interposed between said journal-boxes and said caps, and working in the concave seats thereof, said rollers and seats tending to maintain said axle in an intermediate position transversely of the truck, substantially as described.

3. In a truck, the combination with a main frame having guide-pedestals at its sides, of a pair of rigidly-connected axle-boxes working between said pedestals, transversely of said frame, said boxes having concave roller-seats in their top plates, a wheel-equipped axle journaled in said boxes, a pair of rigidly-connected roller-bearing caps held against movement transversely of said main frame, said caps having concave roller-seats, bearing-rollers interposed between said journal-boxes and said roller-caps and working in the concave seats thereof, and a spring-rigging supporting said main frame, certain members of which rest directly upon said roller-caps, substantially as described.

In testimony whereof I affix my signature in presence of two witnesses.

JAMES F. DE VOY.

Witnesses:
GEORGE DAYTON,
HERBERT E. BROWNELL.